US009463528B2

(12) United States Patent
Reichenbach et al.

(10) Patent No.: US 9,463,528 B2
(45) Date of Patent: Oct. 11, 2016

(54) LASER SYSTEMS AND METHODS FOR INTERNALLY MARKING THIN LAYERS, AND ARTICLES PRODUCED THEREBY

(71) Applicant: ELECTRO SCIENTIFIC INDUSTRIES, INC., Portland, OR (US)

(72) Inventors: Robert Reichenbach, Portland, OR (US); Chuan Yang, Portland, OR (US); Fang Shan, San Jose, CA (US)

(73) Assignee: Electro Scientific Industries, Inc., Portland, OR (US)

( * ) Notice: Subject to any disclaimer, the term of this patent is extended or adjusted under 35 U.S.C. 154(b) by 142 days.

(21) Appl. No.: 14/461,171

(22) Filed: Aug. 15, 2014

(65) Prior Publication Data

US 2015/0050468 A1   Feb. 19, 2015

Related U.S. Application Data

(60) Provisional application No. 61/866,705, filed on Aug. 16, 2013.

(51) Int. Cl.
*B32B 3/02* (2006.01)
*B23K 26/00* (2014.01)
*B23K 26/08* (2014.01)

(52) U.S. Cl.
CPC ....... *B23K 26/0624* (2015.10); *B23K 26/0006* (2013.01); *B23K 26/0063* (2013.01); *B23K 26/082* (2015.10); *B23K 26/083* (2013.01); *B23K 26/0869* (2013.01);
(Continued)

(58) Field of Classification Search
CPC ............. B23K 26/082; B23K 26/083; B23K 26/0057; B23K 26/0063; B23K 26/0624; B23K 26/0853; B23K 26/0869; B23K 2201/34; B23K 2201/40; B23K 2203/08; B23K 2203/56; Y10T 428/24802
See application file for complete search history.

(56) References Cited

U.S. PATENT DOCUMENTS 5,751,585 A    5/1998  Cutler et al.
6,433,301 B1   8/2002  Dunsky et al.
(Continued)

FOREIGN PATENT DOCUMENTS

WO    01/87534 A2      11/2001
WO    2007/047777 A1    4/2007
WO    2012/121732 A1    9/2012

OTHER PUBLICATIONS

International Search Report of PCT/US2014/051349, 5 pages.
(Continued)

*Primary Examiner* — Elizabeth Mulvaney (57) ABSTRACT

Laser output (114) is employed to mark an article (100) including a layer (104) supported by a substrate (102), wherein the layer (104) has a thickness (t) that is less than or equal to 50 microns. The laser output (114) is focused to a numerical aperture diffraction-limited spot size (32) of less than or equal to 5 microns at a focal point (80) of the beam waist (90) and directed into the layer (104) to form a plurality of structures comprising a plurality of laser-induced cracks within the layer (104) and within a region of the article (100), wherein the laser-induced cracks terminate within the layer (104) without extending to the substrate (102) or an outer surface (108) of the layer (104), and wherein the plurality of structures are configured to scatter light incident upon the article (100).

27 Claims, 8 Drawing Sheets

(52) U.S. Cl.
CPC ...... *B23K 2201/34* (2013.01); *B23K 2201/40* (2013.01); *B23K 2203/08* (2013.01); *B23K 2203/10* (2013.01); *B23K 2203/14* (2013.01); *B23K 2203/56* (2015.10); *Y10T 428/24802* (2015.01)

(56) References Cited

U.S. PATENT DOCUMENTS

| | | |
|---|---|---|
| 6,483,071 B1 | 11/2002 | Hunter et al. |
| 6,706,999 B1 | 3/2004 | Barrett et al. |
| 7,019,891 B2 | 3/2006 | Johnson |
| 7,363,180 B2 | 4/2008 | Swaringen et al. |
| 8,379,679 B2 | 2/2013 | Zhang et al. |
| 8,451,873 B2 | 5/2013 | Zhang |
| 8,515,701 B2 | 8/2013 | Swaringen et al. |
| 2009/0280623 A1 | 11/2009 | Kurita |
| 2011/0193928 A1 | 8/2011 | Zhang |
| 2011/0193929 A1 | 8/2011 | Zhang et al. |
| 2011/0194574 A1 | 8/2011 | Zhang et al. |
| 2013/0022766 A1 | 1/2013 | Butzke et al. |
| 2013/0143013 A1 | 6/2013 | Reichenbach et al. |
| 2013/0208074 A1 | 8/2013 | Zhang et al. |
| 2013/0251960 A1* | 9/2013 | Zhang ................. B41J 2/442 428/195.1 |
| 2014/0263212 A1 | 9/2014 | Zhang |

OTHER PUBLICATIONS

Written Opinion of PCT/US2014/051349, 10 pages.
Glezer, E. N., M. Milosavljevic, L Huang, R. J. Finlay, T-H. Her, J. Paul Callan, and Eric Mazur. "Three-dimensional optical storage inside transparent materials." Optics Letters 21, No. 24 (1996): 2023-2025.
Juodkazis, S., K Nishimura, S. Tanaka, H. Misawa, E. G. Gamaly, B. Luther-Davies, L. Hallo, Ph Nicolaï, and V. T. Tikhonchuk. "Laser-induced microexplosion confined in the bulk of a sapphire crystal: evidence of multimegabar pressures." Physical review letters 96, No. 16 (2006): 166101.
Moser, Rüdiger, Nirdesh Ojha, Michael Kunzer, and Ulrich T. Schwarz. "Sub-surface channels in sapphire made by ultraviolet picosecond laser irradiation and selective etching." Optics Express 19, No. 24 (2011): 24738-24745.

\* cited by examiner

LASER SYSTEMS AND METHODS FOR INTERNALLY MARKING THIN LAYERS, AND ARTICLES PRODUCED THEREBY

RELATED APPLICATIONS

This application is a non-provisional application of, and claims priority benefit from, U.S. Patent Provisional Application No. 61/866,705, which was filed on 16 Aug. 2013, the contents of which are herein incorporated by reference in their entirety for all purposes.

COPYRIGHT NOTICE

© 2014 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This application relates to laser marking and, in particular, to laser systems and/or methods for internally laser marking thin layers.

BACKGROUND

A laser can be employed to mark an anodized aluminum article. The laser marks may appear black or white depending on a wide variety or variables. If the laser marking process is performed improperly, however, the surface of the anodized aluminum layer can become undesirably cracked or otherwise damaged, resulting in increased susceptibility of the anodized aluminum layer to become scratched, etched, removed, or otherwise undesirably damaged. Undesirable damage to the anodized aluminum layer can lead to an increased likelihood that the underlying aluminum base substrate can become undesirably scratched, abraded, oxidized, corroded, or otherwise undesirably damaged.

SUMMARY OF DISCLOSURE

This summary is provided to introduce a selection of concepts in a simplified form that are further described in the detailed description of the exemplary embodiments. This summary is not intended to identify key or essential inventive concepts of the claimed subject matter, nor is it intended for limiting the scope of the claimed subject matter.

In some embodiments, an article comprises a thin layer of sapphire or other wafer material.

In some embodiments, an article comprises a layer supported by a substrate.

In some embodiments, a method for marking an article including a substrate and a layer supported by the substrate, wherein the layer has an inner surface and an outer surface, and wherein the outer surface has a farther distance to the substrate and the inner surface has a closer distance to the substrate, comprises: generating a beam of laser output having a beam waist; and directing a focal point of the laser output between the inner surface and outer surface of the layer with an energy density at the focal point sufficient to form a plurality of structures within a region of the article and spaced apart from the outer surface of the article, wherein the layer has a thickness between the inner surface and the outer surface that is less than or equal to 50 microns, and wherein the plurality of structures are configured to scatter light incident upon the outer surface of the layer.

In some alternative, additional, or cumulative embodiments, a laser system for marking an article including a substrate and a layer supported by the substrate, wherein the layer has an inner surface and an outer surface, and wherein the outer surface has a farther distance to the substrate and the inner surface has a closer distance to the substrate, comprises: a laser configured to generate laser light; a beam modification system configured to modify the laser light; a lens configured to focus the laser light to a spot size of less than or equal to 5 microns at a focal point; a height control mechanism to adjust the height of the focal point with respect to the inner surface, the outer surface, or the substrate; and a controller configured to control an operation of at least one of the laser, the height control mechanism, and the beam modification system such that the focal point of the laser light is directed between the inner surface and outer surface of the layer, which has a thickness between the inner surface and the outer surface that is less than or equal to 50 microns, to form a plurality of structures within a region of the article and spaced apart from the outer surface of the article and such that the plurality of structures are configured to scatter light incident upon the region of the layer.

In some alternative, additional, or cumulative embodiments, an article having a mark made with a laser, comprises: a substrate comprising a metal; a layer supported by the substrate and comprising an oxide, wherein the layer has an inner surface and an outer surface, wherein the outer surface has a farther distance to the substrate and the inner surface has a closer distance to the substrate, and wherein the layer has a thickness between the inner surface and the outer surface that is less than or equal to 50 microns; and a plurality of structures comprising a plurality of laser-induced cracks between the inner surface and outer surface of the layer and within the region of the article, wherein the laser induced cracks terminate within the layer without extending to the outer surface or the substrate, and wherein the plurality of structures are configured to scatter light incident upon the region of the layer.

In some alternative, additional, or cumulative embodiments, the beam waist of the laser output exhibits divergence away from the focal point that is so rapid that the energy density at the outer surface and the inner surface is sufficiently smaller than at the focal point such that the energy density at the outer surface and the inner surface is insufficient to permanently change the outer surface and the inner surface.

In some alternative, additional, or cumulative embodiments, the spot size is numerical aperture diffraction-limited.

In some alternative, additional, or cumulative embodiments, the beam of laser output is focused to a spot size of less than or equal to 5 microns (μm) at a focal point of the beam waist.

In some alternative, additional, or cumulative embodiments, the thickness between the inner surface and the outer surface is less than or equal to 100 microns, 75 microns, 50 microns, 40 microns, or less than or equal to 30 microns, or less than or equal to 20 microns, or less than or equal to 10 microns.

In some alternative, additional, or cumulative embodiments, the thickness of the layer is greater than or equal to 5 μm.

In some alternative, additional, or cumulative embodiments, the plurality of structures constitute a mark having an optical density with an L* value that is greater than or equal to about 70.

In some alternative, additional, or cumulative embodiments, the plurality of structures constitute a mark having an optical density with an L* value that is greater than or equal to about 80.

In some alternative, additional, or cumulative embodiments, the plurality of structures constitute a mark having an optical density with an L* value that is greater than or equal to about 90.

In some alternative, additional, or cumulative embodiments, the substrate comprises a metal, wherein the layer comprises an oxide, wherein the plurality of structures comprise one or more features that scatter light.

In some alternative, additional, or cumulative embodiments, the features that scatter light comprise one of more of cracks, voids, or areas of varying index of refraction within the region of the article.

In some alternative, additional, or cumulative embodiments, the outer surface of the layer is devoid of cracks or fractures associated with the mark.

In some alternative, additional, or cumulative embodiments, the substrate is devoid of cracks or fractures associated with the mark.

In some alternative, additional, or cumulative embodiments, the substrate material, is devoid of cracks, burring, or other possible affects from the laser in the region of the plurality of structures.

In some alternative, additional, or cumulative embodiments the focal spot is positioned greater than 2 microns away from both the inner surface and the outer surface.

In some alternative, additional, or cumulative embodiments the focal spot is positioned greater than 5 microns away from both the inner surface and the outer surface.

In some alternative, additional, or cumulative embodiments, the focal spot is controlled within a height accuracy of 2 microns within the layer.

In some alternative, additional, or cumulative embodiments, the focal spot is controlled within a height accuracy of 1 micron within the layer.

In some alternative, additional, or cumulative embodiments, height control feed back is employed to control the height of the focal spot within the layer.

In some alternative, additional, or cumulative embodiments, the major spatial axis the beam waist is greater than a factor of 110% per micron distance along the beam axis from the focal spot.

In some alternative, additional, or cumulative embodiments, the major spatial axis the beam waist is greater than a factor of 115% per micron distance along the beam axis from the focal spot.

In some alternative, additional, or cumulative embodiments, the major spatial axis the beam waist is greater than a factor of 120% per micron distance along the beam axis from the focal spot.

In some alternative, additional, or cumulative embodiments, the beam of laser output is directed at the substrate at an angle of incidence that is greater than or equal to 30 degrees, or greater than or equal to 45 degrees, or greater than or equal to 60 degrees.

In some alternative, additional, or cumulative embodiments, wherein the laser pulses impinge upon the article with a positional separation in a range from about 0.2 µm to about 2.5 µm.

In some alternative, additional, or cumulative embodiments, laser pulses impinge upon the article with a bite size in a range from about 0.2 µm to about 2.5 µm.

In some alternative, additional, or cumulative embodiments, the laser system includes a lens having a numerical aperture in a range from 0.3 to 0.8.

In some alternative, additional, or cumulative embodiments, the lens has a numerical aperture is greater than or equal to 0.5, greater than or equal to 0.6, or greater than or equal to 0.7, or greater than or equal to 0.8.

In some alternative, additional, or cumulative embodiments, the laser output includes laser pulses of laser light having a pulse duration in a range from 0.1 ps to 100 ps.

In some alternative, additional, or cumulative embodiments, the laser output includes laser pulses of laser light having an infrared wavelength.

In some alternative, additional, or cumulative embodiments, the layer is undyed.

In some alternative, additional, or cumulative embodiments, the substrate is undyed.

In some alternative, additional, or cumulative embodiments, both the layer and the substrate are undyed.

Additional aspects and advantages will be apparent from the following detailed description of exemplary embodiments, which proceeds with reference to the accompanying drawings.

DETAILED DESCRIPTION OF EXEMPLARY EMBODIMENTS

The exemplary embodiments are described in sufficient detail with reference to the accompanying drawings to enable those skilled in the art to make and use the disclosed subject matter. It is to be understood that other embodiments would be evident based on the present disclosure, and that process or mechanical changes may be made without departing from the scope of the disclosure defined in the claims. In the following description, numerous specific details are given to provide a thorough understanding of the disclosure. However, it will be apparent that the subject matter of the disclosure may be practiced without these specific details. In order to avoid obscuring the present invention, some well-known system configurations and process steps are not disclosed in detail.

Likewise, the drawings showing embodiments of the system are schematic and not to scale and, particularly, some of the dimensions are for the clarity of presentation and are shown greatly exaggerated in the drawing figures. In addition, where multiple embodiments are disclosed and described having some features in common, for clarity and ease of illustration, description, and comprehension thereof, similar and like features one to another will ordinarily be described with like reference numerals.

Moreover, the terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

Figure 1:
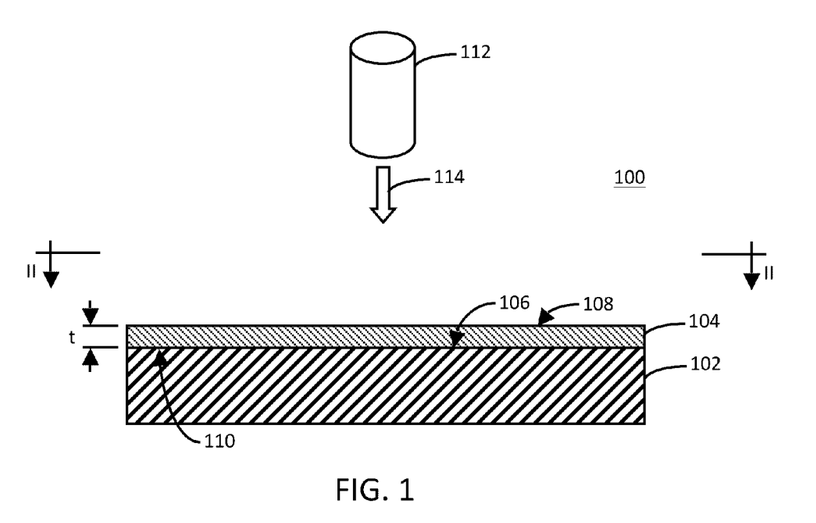
FIG. 1 is a cross-section view schematically illustrating an exemplary article to be marked according to embodiments of the present invention.
Figure 2:
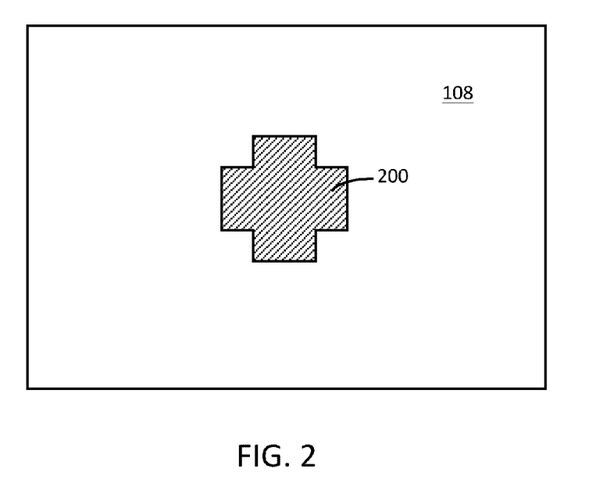
FIG. 2 is a plan view, taken along line II-II in FIG. 1, schematically illustrating an exemplary mark formed on the article shown in FIG. 1.

FIG. 1 illustrates a cross-section view of an exemplary article 100 to be marked according to exemplary embodiments disclosed herein. FIG. 2 illustrates a plan view, taken along line II-II in FIG. 1, of an exemplary mark 200 formed on the article 100 shown in FIG. 1.

Referring to FIG. 1, an article such as article 100 includes a substrate 102 and a film or layer 104. The substrate 102 can be formed of a material such as a metal or metal alloy. For example, the substrate can be formed of a metal such as aluminum, titanium, zinc, magnesium, niobium, tantalum, or the like, or an alloy containing one or more of aluminum, titanium, zinc, magnesium, niobium, tantalum, or the like. The layer 104 can be a material such as a metal oxide. In one embodiment, the layer 104 includes an oxide of one or more metals within the substrate 102, but could include an oxide of a metal not found in the substrate 102.

The layer 104 may be formed by any suitable process. For example, the layer 104 can be formed by a physical vapor deposition process, a chemical vapor deposition process, an anodization process (e.g., involving exposure to chromic acid, sulfuric acid, oxalic acid, sulfosalicylic acid, phosphoric acid, borate or tartrate baths, or the like, to a plasma, or the like, or a combination thereof), or the like, or a combination thereof.

The layer 104 may be dyed or otherwise colored. However, in many embodiments, the layer 104 is undyed. It is noted that laser-bleaching techniques, such as disclosed in U.S. Pat. No. 8,451,873, rely on the dye breakdown (removing the effectiveness of the dye) in the anodization layer 104. Typically, the best color such process can create without altering the outer surface 108 or the substrate surface 106 is the native color of the metallic substrate 102 (e.g. about L*<40). Such processes cannot create significant contrast without the dye.

Generally, the layer 104 has a thickness, t, which is 100 microns (μm) or less. In some embodiments, t is less than or equal to 75 μm. In some embodiments, t is less than or equal to 50 μm. In some embodiments, t is less than or equal to 40 μm. In some embodiments, t is less than or equal to 30 μm. In some embodiments, t is less than or equal to 25 μm. In some embodiments, t is less than or equal to 20 μm. In some embodiments, t is less than or equal to 15 μm. In some embodiments, t is less than or equal to 10 μm. In some embodiments, t is greater than or equal to 3 μm. In some embodiments, t is greater than or equal to 5 μm. In some embodiments, t is greater than or equal to 10 μm.

In some embodiments, characteristics of the layer 104 (e.g., the material composition, thickness, molecular geometry, crystal structure, electronic structure, microstructure, nanostructure, or the like or a combination thereof) may be selected such that a surface (e.g., substrate surface 106) of the substrate 102 is at least partially visible through the layer 104. In one embodiment, the layer 104 acts to protect the substrate surface 106 from scratches, abrasion, oxidation, corrosion, and other types of damage. Thus, the layer 104 can also be referred to herein as a "passivation layer" or "passivation film." In the illustrated embodiment, the layer 104 adjoins (i.e., directly contacts) the substrate 102. In other embodiments, however, the layer 104 can be adjacent to the substrate 102, but not contact the substrate 102. For example, an intervening layer (e.g., a native oxide layer having a different composition from the layer 104, a different structure from the layer 104, etc.) can be located between the substrate 102 and the layer 104. Although the article 100 has been discussed above as including the substrate 102 and the layer 104, it will be appreciated that the substrate 102 may be omitted, and the article 100 may be provided simply as layer (e.g., having a thickness in a range from about 3 mm to about 10 μm) formed of a transparent or translucent material such as sapphire, glass, polycarbonate, or the like, or a combination thereof.

Constructed as described above, the article 100 can be provided as at least a portion of a housing for device such as a personal computer, a laptop computer, a tablet computer, a personal digital assistant, a portable media player, a television, a computer monitor, a telephone, a mobile phone, an electronic book, a remote controller, a pointing device (e.g., a computer mouse), a game controller, a thermostat, a dishwasher, a refrigerator, a microwave, a watch, or the like, or may be provided as a button of any other device or product, or may be provided as a component of a display (e.g., an LCD display, an LED display, an OLED display, a touchscreen display, or the like), or may be provided as a sign or badge, or the like. Constructed as described above, the article 100 includes an outer surface 108 of the layer 104 that has a visual appearance.

According to some embodiments, the visual appearance of a portion of the article 100 (also referred to herein as a "preliminary visual appearance") can be modified to form a mark (e.g., mark 200, as shown in FIG. 2) that is visible at the outer surface 108 of the article 100. Although the mark 200 is illustrated in a single specific form, it will be appreciated that the mark 200 can have any shape, and more than one mark 200 can be provided. In some examples, the mark 200 can be textual, graphic, or the like or a combination thereof, and may convey information such as the name of a product, the name of a product manufacturer, a trademark, copyright information, design location, assembly location, model number, serial number, license number, an agency approval, standards compliance information, an electronic code, a logo, a certification mark, an advertisement, a user-customizable feature, or the like or a combination thereof.

The mark 200 may itself be comprised of an interconnecting network or other arrangement of small cracks or fractures formed within the layer 104, between the outer surface 108 and an inner surface 110, which is closer to the substrate 102 than the outer surface 108. All of, or substantially all of the cracks or fractures of the mark 200 are spaced apart from the outer surface 108. Depending on the thickness of the layer 104, the cracks or fractures of the mark 200 can be formed at a depth within the layer in a range from about 10 µm to about 100 µm. Optionally, all of, or substantially all of the cracks or fractures of the mark 200 can be spaced apart from the inner surface 110. The mark 200 can have a modified visual appearance that is lighter than the preliminary visual appearance. For example, the modified visual appearance of the mark 200 may have a white or substantially white visual appearance. Depending on the size and density of cracks or fractures within the mark 200, the mark 200 may be opaque or translucent. Because the cracks or fractures within the mark 200 are spaced apart from the outer surface 108, the structural integrity of the outer surface 108 in the vicinity of the mark 200 can be maintained, thus preserving the ability of the layer 104 to protect the substrate surface 106 from scratches, abrasion, oxidation, corrosion, and other types of damage.

Having described an article 100 and the mark 200 according to some embodiments of the present invention, an exemplary process of forming the mark 200 will now be described.

In one embodiment, the mark 200 may be formed by performing a modification process in which at least one characteristic (e.g., a chemical composition, molecular geometry, crystal structure, electronic structure, microstructure, nanostructure, or the like or a combination thereof) of a target region of the article 100 is modified. In one embodiment, the target region of the article 100 is located within the layer 104, between the outer surface 108 and the inner surface 110. In one embodiment, modifying the at least one characteristic of the target region results in the formation of the aforementioned cracks or fractures within the layer 104 that can scatter light incident upon the outer surface 108 to form a mark 200 that is visible at the outer surface 108 of the article 100.

In some embodiments, the visual appearance of the resultant mark 200 can be described using CIE 1976 L*a*b* (also known as CIELAB, a color space standard specified by the International Commission on Illumination). CIELAB describes colors visible to the human eye and was created to serve as a device independent model to be used as a reference. The three coordinates of the CIELAB standard represent: 1) the lightness factor magnitude of the color (L*=0 yields ultimate black and L*=100 indicates diffuse ultimate white, 2) its position between red/magenta and green (a*, negative values indicate green while positive values indicate magenta) and 3) its position between yellow and blue (b*, negative values indicate blue and positive values indicate yellow). Measurements in a format corresponding to the CIELAB standard may be made using a spectrophotometer, such as the COLOREYE® XTH Spectrophotometer, sold by GretagMacbeth®. Similar spectrophotometers are available from X-Rite™.

In view of the disclosure herein, it will be appreciated that particular values (or ranges of values) for laser conditions (e.g., including wavelength, pulse duration, pulse repetition rate, pitch, bite size, pulse energy, or the like or any combination thereof) can be variably selected to ensure the formation of a sufficiently white mark 200 (e.g., having an L* value of greater than or equal to about 70 while ensuring that the outer surface of the layer 108 and the substrate surface 106 within the vicinity of the mark 200 is not undesirably damaged (e.g., due to ablation, cracking, etching, bubbling, peeling, etc.). In some embodiments, the L* value is greater than or equal to about 75. In some embodiments, the L* value is greater than or equal to about 80 In some embodiments, the L* value is greater than or equal to about 90. In some embodiments, the L* value is greater than or equal to about 95.

Figure 7:
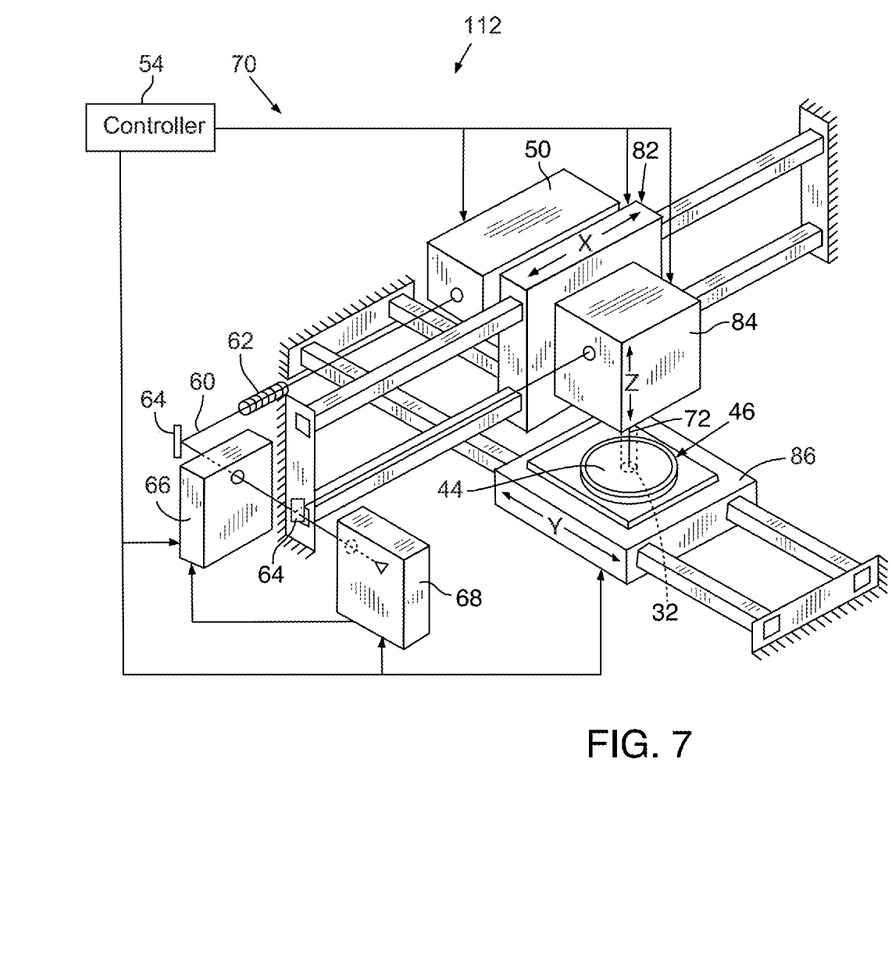
FIG. 7 is simplified and partly schematic perspective view of some components of an exemplary laser micromachining system suitable for producing the plurality of laser-induced cracks constituting a mark.

The modification process may be performed in any suitable manner. For example, the target region can be modified by directing a beam of laser output such as first optical pulses (e.g., pulses of laser light, also referred to herein as "laser pulses") onto the article 100. As exemplarily shown in FIG. 1, a laser micromachining system 112 may generate and direct a beam of laser output 114 (including one or more laser pulses 52 (FIG. 8)) toward the article 100 along a beam axis 72 (FIG. 7). Characteristics of the beam of laser pulses (e.g., pulse wavelength, pulse duration, pulse energy, scan rate, pulse repetition frequency, bite size, etc.) can be selected to modify the target region and form the mark 200 while ensuring that the outer surface 108 is not undesirably damaged (i.e., ablated, cracked, etched, etc.).

In some embodiments, the laser system 112 includes a scan lens having a numerical aperture in a range from 0.1 to 1 to facilitate determination of the major spatial axis of the laser spot 32. In some embodiments, the numerical aperture is in a range from 0.2 to 0.89. In some embodiments, the numerical aperture is in a range from 0.3 to 0.8. In some embodiments, the numerical aperture is less than or equal to 0.8. In some embodiments, the numerical aperture is greater than or equal to 0.5. In some embodiments, the numerical aperture is greater than or equal to 0.6. In some embodiments, the numerical aperture is greater than or equal 0.7. In some embodiments, the numerical aperture is greater than or equal 0.8.

A very tightly focus spot 32 also has the advantage that the energy density decreases very rapidly away from the focal spot 80. This sharp energy decrease allows the laser pulse-induced damage area to be specifically located in a very thin region of anodization layer 104, or for individual defects or spots 32 to be very closely spaced in a bulk sapphire or glass substrate, allowing for a tightly spaced, high resolution image or mark 200 to be created that has no impact on the surrounding regions.

In some embodiments, a major spatial axis of the spot 32 is between about 1 micron and about 25 microns, or the major spatial axis of the spot 32 is shorter than 25 microns. (A major spatial axis smaller than about 22 microns is invisible to the human eye at a distance of 6.25 cm. Generally, a spot size of about 30 microns or less will be invisible to most human eyes at any distance due to the anatomical constraints of the human eye and the optical constraints of conventional eyewear.) In some embodiments, the major spatial axis of the spot 32 is between about 1 micron and about 10 microns, or the major spatial axis of the spot 32 is shorter than 10 microns. In some embodiments, the major spatial axis of the spot 32 is between about 1 micron and about 5 microns, or the major spatial axis of the spot 32 is shorter than 5 microns.

In some embodiments, the size of the laser spot 32 closely correlates to the "pixel" size of the laser-induced defect caused by the laser spot 32 at the focal spot 80. In some embodiments, the size of the laser spot 32 closely is smaller than the pixel size of the laser-induced defect caused by the laser spot 32 at the focal spot 80. In some embodiments, the size of the laser spot 32 closely is greater than to the pixel size of the laser-induced defect caused by the laser spot 32 at the focal spot 80. In some embodiments, the pixel size of the laser induced defect is less than or equal to about 25 microns. In some embodiments, the pixel size of the laser induced defect is less than or equal to about 15 microns. In some embodiments, the pixel size of the laser induced defect is less than or equal to about 10 microns. In some embodiments, the pixel size of the laser induced defect is less than or equal to about 5 microns. In some embodiments, the pixel size of the laser induced defect is less than or equal to about 2.5 microns. In some embodiments, the pixel size of the laser induced defect is less than or equal to about 1 micron. In some embodiments, the pixel size of the laser induced defect greater than or equal to 0.5 microns. In some embodiments, the pixel size of the laser induced defect greater than or equal to 0.5 microns and less than or equal to about 2.5 microns.

In some embodiments, the scan rate and the pulse repetition frequency can be selected such that the successively directed laser pulses impinge upon the article with a positional separation in a range from about 0.1 μm to about 25 μm. In some embodiments, the positional separation is in a range from about 0.1 μm to about 10 μm. In some embodiments, the positional separation is in a range from about 0.1 μm to about 5 μm. In some embodiments, the positional separation is in a range from about 0.1 μm to about 2.5 μm.

In some embodiments, the scan rate and the pulse repetition frequency can be selected such that the successively directed laser pulses impinge upon the article with a bite size in a range from about 0.1 μm to about 25 μm. In some embodiments, the bite size is in a range from about 0.1 μm to about 10 μm. In some embodiments, the bite size is in a range from about 0.1 μm to about 5 μm. In some embodiments, the bite size is in a range from about 0.1 μm to about 2.5 μm.

In some embodiments, the white mark 200 is generated by raster scanning the focal spot 80 of a high-numerical-aperture objective lens focused inside the sapphire wafer or the anodization layer 104. The impacted area can be tuned by changing the energy density of the spot 32. A single laser pulse can create an approximately sized pixel, defect, or spot 32, which scatters light in such a way that it appears white to the human eye (or to machine vision). The fill factor of the mark 200 can be determined by changing the pulse-to-pulse spacing such that a uniform white appearing mark 200 can be created. The number of scanning passes can also be adjusted to enhance the fill factor. Moreover, the spot placement in one or more of the passes may be shifted with respect to the spot placement in other passes. The spot placement shift can be vertical, horizontal, or both.

As marking on smaller articles 100 has become desirable, the availability of "invisible" marks 200 would be useful for some applications, such as for transparent materials that serve as screens through which unobstructed views are desirable, or such as for proprietary information or secretive manufacturer labeling that could be used for a variety of purposes such as to detect authentic products versus counterfeit products. Invisible laser marks can be made within the layer 104 using the techniques described herein. Invisible marking to provide invisible GS1 DataMatrix codes is described in detail in U.S. patent application Ser. No. 14/194,455 of Justin D. Redd, which is assigned to the assignee of this application, and which is incorporated herein by reference.

In some embodiments, the beam axis 72 of laser output 114 is directed at the article 100 at a nonperpendicular angle of incidence. In some embodiments, angle of incidence is greater than or equal to 15 degrees. In some embodiments, angle of incidence is greater than or equal to 30 degrees. In some embodiments, angle of incidence is greater than or equal to 45 degrees. In some embodiments, angle of incidence is greater than or equal to 60 degrees. In some embodiments, angle of incidence is greater than or equal to 75 degrees. An advantage of directing the beam axis 72 at a nonperpendicular angle of incidence is that an angled beam axis 72 provides a greater distance along the beam axis within the layer 104 than the distance along a perpendicular beam axis 72 within the layer 104. The greater distance provided between the outer surface 108 and the inner surface 110 along the angled beam axis 72 provides a greater margin of error for placement of the focal spot 80 within the layer 104. The angle of incidence of the beam axis 72 can be controlled in many ways. One method of controlling the angle of the beam axis is disclosed in U.S. patent application Ser. No. 14/205,200 of Haibin Zhang, which is assigned to the assignee of this application, and which is incorporated herein by reference.

Figure 6A:
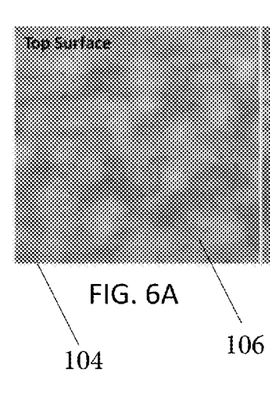
FIGS. 6A through 6C illustrate respective microscopic images of a top surface, a subsurface mark, and a bottom surface of the processed anodized aluminum article depicted in FIGS. 5A and 5B.
Figure 6B:
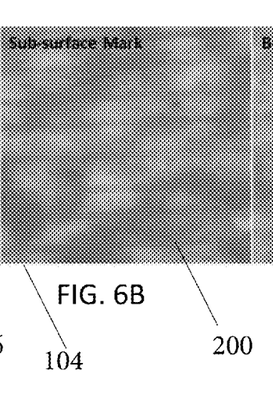
Figure 6C:
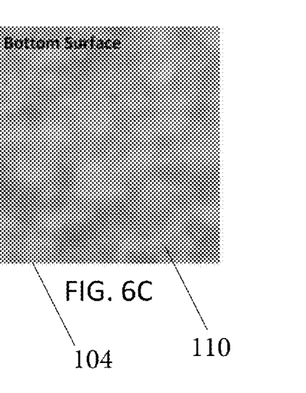

FIG. 7 is simplified and partly schematic perspective view of some components of an exemplary laser micromachining system 112 suitable for producing the plurality of laser-induced cracks constituting a white mark 200. With reference to FIG. 6, some exemplary laser processing systems operable for making the cracks between the outer surface 108 and the substrate surface 106 of the article 100 are the ESI MM5330 micromachining system, the ESI ML5900 micromachining system and the ESI 5955 micromachining system, all manufactured by Electro Scientific Industries, Inc., Portland, Oreg. 97229.

These systems typically employ a solid-state diode-pumped laser, which can be configured to emit wavelengths from about 366 nm (UV) to about 1320 nm (IR) at pulse repetition rates up to 5 MHz. However, these systems system may be adapted by the substitution or addition of appropriate laser, laser optics, parts handling equipment, and control software to reliably and repeatably produce the selected laser-induced cracks within the layer 104 as described herein. These modifications permit the laser processing system to direct laser pulses with the appropriate laser parameters to the desired locations on an appropriately positioned and held article 100 at the desired rate and pitch between laser spots 32 or pulses to create the desired laser-induced crack with desired color, contrast, and/or optical density.

In some embodiments, the laser micromachining system 112 employs a diode-pumped Nd:YVO4 solid-state laser 50 operating at 1064 nm wavelength, such as a model Rapid manufactured by Lumera Laser GmbH, Kaiserslautern, Germany. This laser can be optionally frequency doubled using a solid-state harmonic frequency generator to reduce the wavelength to 532 nm thereby creating visible (green) laser pulses, or tripled to about 355 nm or quadrupled to 266 nm thereby creating ultraviolet (UV) laser pulses. This laser 50 is rated to produce 6 Watts of continuous power and has a maximum pulse repetition rate of 1000 KHz. This laser 50 produces laser pulses 52 (FIG. 8) with duration of 1 picosecond to 1,000 nanoseconds in cooperation with controller 54.

Figure 8:
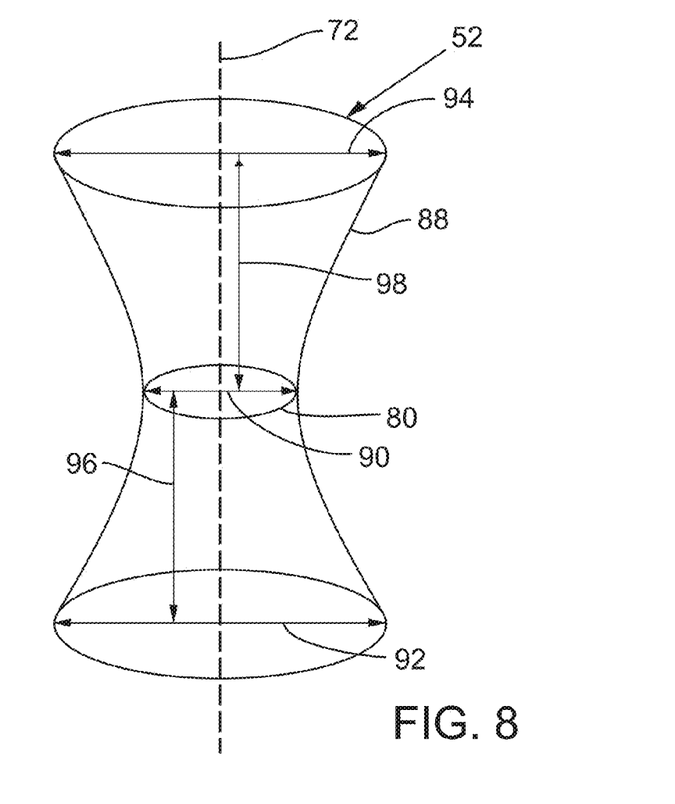
FIG. 8 shows a diagram of a laser pulse focal spot and its beam waist.

These laser pulses 52 may be Gaussian or specially shaped or tailored by the laser optics 62, typically comprising one or more optical components positioned along an optical path 60, to permit desired characteristics of the laser spots 32. For example, a "top hat" spatial profile may be used which delivers a laser pulse 12 having an even dose of radiation over the entire laser spot 32 that impinges the outer surface 108 of the article 100. Specially shaped spatial profiles such as this may be created using diffractive optical elements or other beam-shaping components. A detailed description of modifying the spatial irradiance profile of laser spots 32 can be found in U.S. Pat. No. 6,433,301 of Corey Dunsky et al., which is assigned to the assignee of this application, and which is incorporated herein by reference.

The laser pulses 52 are propagated along an optical path 60 that may also include fold mirrors 64, attenuators or pulse pickers (such as acousto-optic or electro-optic devices) 66, and feedback sensors (such as for energy, timing, or position) 68.

The laser optics 62 and other components along the optical path 60, in cooperation with a laser beam-positioning system 70 directed by the controller 54, direct a beam axis 72 of the laser pulse 52 propagating along the optical path 60 to form a laser focal spot 80 beneath the outer surface 108 of the layer 104 at a laser spot position. The laser beam-positioning system 70 may include a laser stage 82 that is operable to move the laser 50 along an axis of travel, such as the X-axis, and a fast-positioner stage 84 to move a fast positioner (not shown) along an axis of travel, such as the Z-axis. A typical fast positioner employs a pair of galvanometer-controlled mirrors capable of quickly changing the direction of the beam axis 72 over a large field on the article 100. Such field is typically smaller than the field of movement provided by the workpiece stage 86, as later described. An acousto-optic device or a deformable mirror may also be used as the fast positioner, even though these devices tend to have smaller beam deflection ranges than galvanometer mirrors. Alternatively, an acousto-optic device or a deformable mirror may be used as a high-speed positioning device in addition to galvanometer mirrors.

Additionally, the article 100 may be supported by a workpiece stage 86 having motion control elements operable to position the substrate 102 with respect to the beam axis 72. The workpiece stage 86 may be operable to travel along a single axis, such as the Y-axis, or the workpiece stage 86 may be operable to travel along transverse axes, such as the X- and Y-axes. Alternatively, the workpiece stage 86 may be operable to rotate the article 100, such as about a Z-axis (solely, or as well as move the article 100 along the X- and Y-axes).

The controller 54 can coordinate operation of the laser beam-positioning system 70 and the workpiece stage 86 to provide compound beam-positioning capability, which facilitates the capability to mark laser spots 32 within the layer 104 while the article 100 can be in continuous relative motion to the beam axis 72. This capability is not necessary for marking the laser induced cracks within the layer 104, but this capability may be desirable for increased throughput. This capability is described in U.S. Pat. No. 5,751,585 of Donald R. Cutler et al., which is assigned to the assignee of this application, and which is incorporated herein by reference. Additional or alternative methods of beam positioning can be employed. Some additional or alternative methods of beam positioning are described in U.S. Pat. No. 6,706,999 of Spencer Barrett et al. and U.S. Pat. No. 7,019,891 of Jay Johnson, both of which are assigned to the assignee of this application, and which are incorporated herein by reference.

The various beam-positioning systems described herein can be controlled to offer beam-positioning accuracy of laser spot position within a few microns of the desired (x-y) location of a laser spot 32 on the article 100. It is noted, however, that higher accuracy may be implemented with higher cost components, greater feedback control, and/or slower system throughput. However, even very low-cost laser micromachining systems can achieve greater accuracy.

FIG. 8 shows a diagram of the focal spot 80 and its beam waist 90. With reference to FIG. 8, the focal spot 80 of the laser pulse 52 will have a beam waist 90 (cross-section) and laser energy distribution that are largely determined by the laser optics 62. The major spatial axis d of the laser spot 32 is typically a function of the major axis of the beam waist, and the two may be the same or similar. However, the major spatial axis d of the laser spot 32 may be larger than or smaller than the major axis of the beam waist.

The laser optics 62 can be used to control the depth of focus of the beam waist and hence the depth of the laser spot 32 within the layer 104. By controlling the depth of focus, the controller 54 can direct the laser optics 62 and the fast positioner Z-stage 84 to position the laser spot 32 within the layer 104 repeatably with high precision. Making marks 200 by positioning the focal spot below the outer surface 108 of the layer 104 allows the laser beam to be defocused by a specified amount at the outer surface 108 and thereby increase the area illuminated by the laser pulse and decrease the laser fluence at the outer surface 108 (to an amount that is less than the damage threshold of the material of the layer 104 at its outer surface 108). Since the geometry of the beam waist is known, precisely positioning the focal spot 80 below the outer surface 108 and within the layer 104 provides additional precision control over the major spatial axis d and the fluence.

In some embodiments, such as for marking transparent materials such as sapphire, the laser fluence can be precisely controlled at the core of the layer 104 by adjusting the location of the laser spot 32 from being on the outer surface 108 of the layer 104 to being located a precise distance within the layer 104. With reference again to FIG. 8, the beam waist 90 is represented as a spatial energy distribution 88 of a laser pulse 52 along the beam axis 72 as measured by the FWHM method. The major axis 92 represents the laser pulse spot size on the outer surface 108 if the laser micromachining system 112 focuses the laser pulse 52 at a distance 96 above the outer surface 108. The major axis 94 represents the laser pulse spot size on the outer surface 108 if the laser processing system focuses the laser pulses at a distance 98 below the outer surface 108. For most embodiments where internal marking with the laser spots 32 is desirable, the focal spot 80 is directed to be positioned within the layer 104 rather than above or below its outer surface 108. The fluence or irradiance may be employed at an amount that is lower than the ablation threshold of the substrate material except at the focal spot 80, at which the fluence or irradiance is concentrated to be above the ablation threshold of the layer material.

Laser parameters that may be advantageously employed for some embodiments include using lasers 50 with wavelengths that range from IR through UV, or more particularly from about 10.6 microns down to about 266 nm. The laser 50 may operate at 2 W, being in the range of 0.1 W to 100 W, or more preferably 0.1 W to 10 W. Pulse durations (e.g., based on full width at half-maximum, or FWHM) range from 0.1 picosecond to 1000 ns, or more preferably from about 0.1 picosecond to 200 ns, or more preferably from about 0.1 picosecond to 1 ns. The laser repetition rate may be in a range from 1 KHz to 100 MHz, or more preferably from 10 KHz to 1 MHz. Laser fluence may range from about $0.1 \times 10^{-6}$ J/cm$^2$ to 100.0 J/cm$^2$ or more particularly from 1.0 J/cm$^2$ to 20.0 J/cm$^2$. The speed with which the beam axis 72 moves with respect to the article 100 being marked ranges from 1 mm/s to 10 m/s, or more preferably from 100 mm/s to 1 m/s. The pitch or spacing between adjacent rows of spots 32 within the layer 104 may range from 0.1 micron to 1000 microns or more preferably from 0.1 microns to 10 microns. The major spatial axis of the laser pulses 52 measured at the outer surface 108 of the layer 104 may range from 0.5 microns to 50 microns or from 1 micron to 25 microns.

For many embodiments of internal marking, the focal spot 80 is positioned beneath the outer surface 108 of the layer 104 (between the inner surface 110 and the outer surface 108 of the layer 104). The elevation of the focal spot 80 of the laser pulses 52 with respect to the center of the layer 104 may range from −20 μm to +20 μm. In some embodiments, the elevation of the focal spot 80 of the laser pulses 52 with respect to the center of the layer 104 may range from −10 μm to +10 μm. In some embodiments, the elevation of the focal spot 80 of the laser pulses 52 with respect to the center of the layer 104 may range from −5 μm to +5 μm. In some embodiments, the elevation of the focal spot 80 of the laser pulses 52 with respect to the center of the layer 104 may range from −2 μm to +2 μm.

For some embodiments of internal marking, the focal spot 80 is positioned at least 3 microns beneath the outer surface 108 of the layer 104. For some embodiments of internal marking, the focal spot 80 is positioned at least 5 microns beneath the outer surface 108 of the layer 104. For some embodiments of internal marking, the focal spot 80 is positioned at least 10 microns beneath the outer surface 108 of the layer 104.

For some embodiments of internal marking, the focal spot 80 is positioned at least 3 microns above the substrate surface 106. For some embodiments of internal marking, the focal spot 80 is positioned at least 5 microns above the substrate surface 106. For some embodiments of internal marking, the focal spot 80 is positioned at least 10 microns above the substrate surface 106.

In some embodiments, the focal spot is positioned greater than 2 microns away from both the inner surface and the outer surface. In some embodiments, the focal spot is positioned greater than 5 microns away from both the inner surface and the outer surface.

In some embodiments, the focal spot 80 is controlled within a height accuracy of 5 microns within the layer 104. In some embodiments, the focal spot 80 is controlled within a height accuracy of 2 microns within the layer 104. In some embodiments, the focal spot 80 is controlled within a height accuracy of 1 micron within the layer 104. In some embodiments, the focal spot 80 is controlled within a height accuracy of 0.5 micron within the layer 104.

In some embodiments, the major spatial axis the beam waist is greater than a factor of 110% per micron distance along the beam axis 72 from the focal spot 80. For example, a beam having a focal spot 80 with a 1 micron major spatial axis would exhibit a beam waist of greater than 1.1 microns at a 1 micron elevation distance from the focal spot 80, a beam waist of greater than 2.2 microns at a 2 micron distance from the focal spot 80, and a beam waist of greater than 3.3 microns at a 3 micron distance from the focal spot 80.

In some embodiments, the major spatial axis the beam waist is greater than a factor of 115% per micron distance along the beam axis 72 from the focal spot 80. For example, a beam having a focal spot 80 with a 1 micron major spatial axis would exhibit a beam waist of greater than 1.15 microns at a 1 micron elevation distance from the focal spot 80, a beam waist of greater than 2.3 microns at a 2 micron distance from the focal spot 80, and a beam waist of greater than 3.45 microns at a 3 micron distance from the focal spot 80.

In some embodiments, the major spatial axis the beam waist is greater than a factor of 120% per micron distance along the beam axis 72 from the focal spot 80. For example, a beam having a focal spot 80 with a 1 micron major spatial axis would exhibit a beam waist of greater than 1.2 microns at a 1 micron elevation distance from the focal spot 80, a beam waist of greater than 2.4 microns at a 2 micron distance from the focal spot 80, and a beam waist of greater than 3.6 microns at a 3 micron distance from the focal spot 80.

The divergence of the major spatial axis of the beam waist as it moves away from the focal spot 80 is so rapid that the energy density at the outer surface 108 and the inner surface 110 is sufficiently smaller than at the focal spot 80 such that the energy density at the outer surface 108 and the inner surface 110 is insufficient to permanently change the outer surface 108 and the inner surface 110.

In one example, at a 1064 nm wavelength, if the major spatial axis is 1.5 microns at a focal spot 80 centered in the middle of a 30-micron thick anodization layer 104, Gaussian Beam Propagation Theory can be to calculate the spread of the major spatial axis of the beam waist to be 16 microns at the outer and inner surfaces of the anodization layer 104 (which are both 15 microns away from the focal spot 80). Similarly, the same beam would have a beam axis of about 8 microns at a distance of 7.5 microns away from focal spot 80.

Applicant discovered that use of a subsurface focal spot 80 in combination with the use of picosecond lasers, which produce laser pulsewidths in the range from 1 to 1,000 picoseconds, provided a good way to reliably and repeatably create marks 200 within some transparent layers 104 or transparent semiconductor substrates, such as sapphire. In some embodiments, pulsewidths in a range from 0.1 to 1000 ps can be employed. In some embodiments, pulsewidths in a range from 1 to 100 ps can be employed. In some embodiments, pulsewidths in a range from 5 to 75 ps can be employed. In some embodiments, pulsewidths in a range from 10 to 50 ps can be employed. A femtosecond laser, producing wavelengths in the 10- to 1000-femtosecond range, would alternatively provide good results. An advantage of using picosecond lasers, however, is that they are much less expensive, require much less maintenance, and typically have much longer operating lifetimes than existing femtosecond lasers.

Although marking can be accomplished at a variety of wavelengths as previously discussed, applicant found that visible lasers, particularly green lasers, operating in the picosecond ranges provide particularly repeatable good results. Wavelengths at or near 532 nm were particularly advantageous, but 1064 nm could be employed. An exemplary laser 50 was a Lumera 6 W laser. It will be appreciated that fiber lasers or other types of lasers could be employed.

Other techniques for tailoring the marking for anodized aluminum articles 100 can also be employed. Some of such techniques are described in detail in U.S. Pat. No. 8,379,679, U.S. Pat. No. 8,451,873, and U.S. Pat. Pub. No. 2013-0208074, all of Haibin Zhang et al., all of which are assigned to the assignee of this application, and both of which are incorporated herein by reference.

As previously discussed, thin layer materials can be marked internally by selectively directing the focal point within the layer 104. Internal marking of the layer 104 retains the integrity of the outer surface 108, such as its water and dirt resistance. Internal marking also reduces crack propagation and other adverse effects created by surface marking.

In one embodiment, the pulse wavelength can be in the infrared range of the electromagnetic spectrum (e.g., 1064 nm or thereabout) or, provided that other characteristics of the beam of laser pulses is properly compensated for, in other ranges of the electromagnetic spectrum such as the visible range (e.g., in the green range) or in the ultraviolet range. The pulse duration (e.g., based on full width at half-maximum, or FWHM) of the laser pulses can be in a range from 0.1 picoseconds to 1000 picoseconds. The pulse energy of the beam of laser pulses can be in a range from 0.01 µJ to 10 µJ. The scan rate of the beam of laser pulses can be in a range from 50 mm/s to 500 mm/s. The pulse repetition frequency can be in a range from 100 kHz to 1 MHz. In one embodiment, the scan rate and the pulse repetition frequency can be selected such that the successively directed laser pulses impinge upon the article with a bite size in a range from about 0.2 µm to about 2.5 µm. It will be appreciated, however, that any of the aforementioned laser pulse characteristics can be varied to be outside the ranges discussed above depending on, for example, the material of the layer 104, the thickness t of the layer 104, or the like or a combination thereof.

In one embodiment, the laser system 112 includes a scan lens having a numerical aperture in a range from 0.3 to 0.8. The scan lens is used to focus the beam of laser pulses such that the resulting beam waist is located inside the layer 104, between the outer surface 108 and the inner surface 110. In one embodiment, the laser system 112 optionally includes a support system configured to hold the article 100 during the white marking process, to move (e.g., rotate, translate, or the like or a combination thereof) the article 100 during the white marking process, or the like or a combination thereof.

Measuring the Z axis height of the outer surface 108 or the substrate surface 106 can be performed in any one of a number of methods. One such method entails acquiring images of the laser spot illuminating a reflective target on the outer surface 108 or the substrate surface 106. The system can be stepped through several steps in Z height, and the beam is scanned across the edge of the target at each step. The sharpness of the change in reflection during the scan across the edge of the target is measured at each step, and the sharpness values associated with the Z height step are plotted. The point of maximum sharpness and hence the true Z height of the outer surface 108 or the substrate surface 106 is the Z height corresponding to the potentially interpolated peak of the sharpness curve. In similar fashion, any portion of the article 100 containing sufficient surface detail can be imaged under laser illumination to yield a contrast value. If the system Z height is stepped through several values and the contrast values plotted as above, the Z height can be deduced from the point of maximum contrast. Z height can also be measured directly by any one of a number of methods, including laser triangulation or interferometry. Specific exemplary methods of Z height control can be found in U.S. Pat. Nos. 6,483,071, 7,363,180, and 8,515,701, which are assigned to the assignee of this application, and which are incorporated herein by reference.

Generally one accurate z-measurement approach would be to exactly measure the laser focal position with respect to the outer or inner surface 108,110 of the anodization layer 104 or the substrate surface 106 of the metal substrate 102. This measurement could be accomplished through sensing of feedback from laser material interaction (through the lens brightness or spectrum monitoring). This measurement could also be accomplished through measurement of the intensity of a low (laser) power pulse reflected back through the lens system.

Additional surface monitoring could also be employed to increase control. Such surface monitoring could include one or more of touch probe monitoring, capacitive sensing, inductive sensing, laser displacement (triangulation) sensing, an interferometric monitoring.

Generally, the laser system 112 may further include a controller (not shown) coupled to at least one of the laser source, the beam modification system, the beam steering system and the support system to form the mark 200. The controller may, for example, include a processor communicatively coupled to memory. Generally, the processor can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, processor includes a programmable microcontroller microprocessor, or other processor that can include one or more processing units arranged to execute instructions stored in memory in accordance with the operating logic. Memory can include one or more types including semiconductor, magnetic, and/or optical varieties, and/or may be of a volatile and/or nonvolatile variety. In one embodiment, memory stores instructions that can be executed by the operating logic. Alternatively or additionally, memory may store data that is manipulated by the operating logic. In one arrangement, operating logic and memory are included in a controller/processor form of operating logic that manages and controls operational aspects of any component of the apparatus described with respect to FIG. 1, although in other arrangements they may be separate.

Having exemplarily described some embodiments of a white marking process, including process parameters useful in creating a mark 200, some specific embodiments exemplifying particular combinations of process parameters, and the resultant mark 200, are discussed below.

EXAMPLE 1

Figure 3:
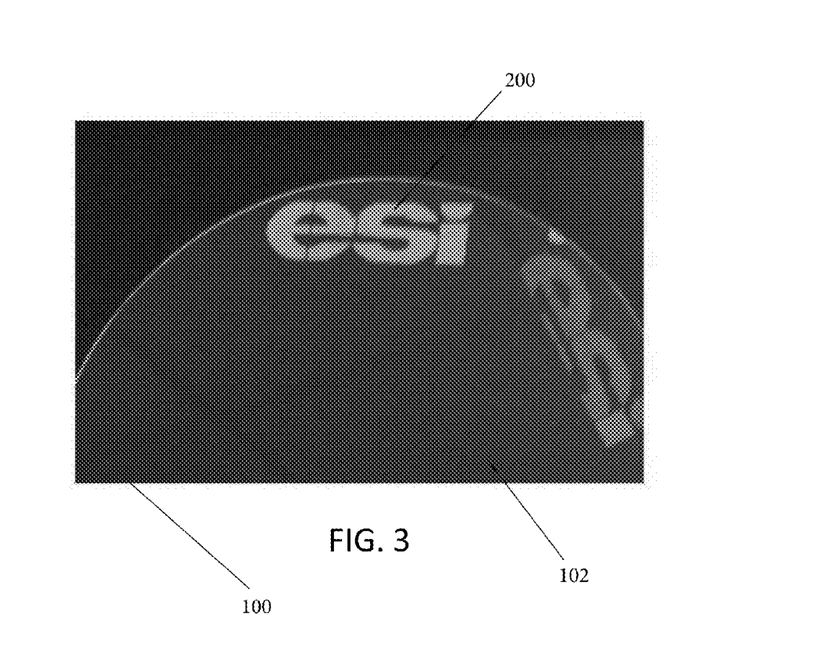
FIG. 3 depicts a sapphire wafer marked according to an embodiment of a white marking process.

A sub-surface white mark 200 was formed in a sapphire wafer, using a scan lens (Thorlabs LMH-20x-1064, NA=0.4) that was raster scanned with pitch size of 30 µm. Some process parameters of the example process are listed as below in Table 1. FIG. 3 illustrates a sapphire wafer marked (i.e., with the trademarked logo associated with Electro Scientific Industries, Inc.) according to the white marking process described with respect to this example.

Figure 4A:
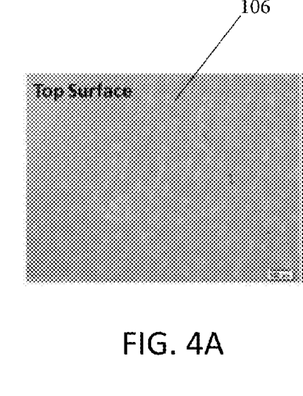
FIGS. 4A through 4C illustrate respective microscopic images of a top surface, a subsurface mark, and a bottom surface of the processed sapphire wafer depicted in FIG. 3.
Figure 4B:
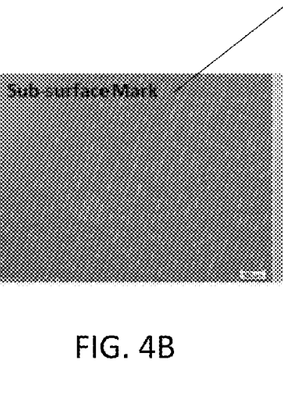
Figure 4C:
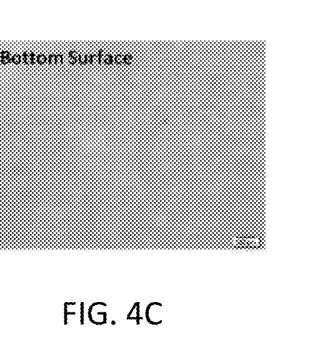

FIGS. 4A through 4C (collectively FIG. 4) illustrate respective microscopic images of a top surface, a subsurface mark 200, and a bottom surface of the processed sapphire wafer illustrated in FIG. 3. FIGS. 4A and 4C show that both the top and bottom surfaces are intact (i.e., devoid of cracks or fractures associated with the mark 200). FIG. 4B illustrates a microscopic image of the interior of the sapphire wafer, showing scanned lines where cracks or fractures have been formed as a result of the white marking process.

TABLE 1

| Wavelength | 1064 nm |
|---|---|
| Pulse Energy | ~10 µJ |
| Pulse Duration | 50 ps |
| Pulse Repetition Frequency | 125 kHz |
| Scan Speed | 240 mm/s |
| Bite Size | 1.9 µm |
| Numerical Aperture | 0.4 |
| Scan Pitch | 30 µm |
| Depth of Mark | 70 µm~100 µm |

EXAMPLE 2

Figure 5A:
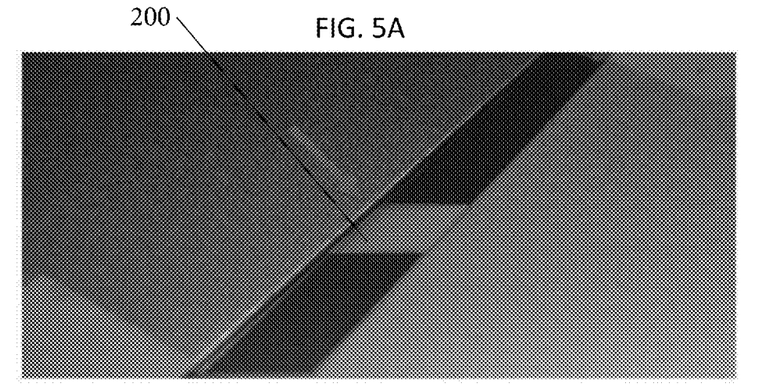
FIGS. 5A and 5B depict a thin anodized aluminum layer of an anodized aluminum article marked according to an embodiment of a white marking process.
Figure 5B:
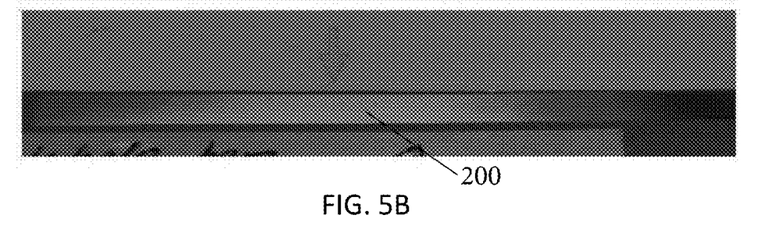

A sub-surface white mark 200 was formed in an anodized aluminum layer having a thickness of about 30 µm, wherein the anodized aluminum layer was part of an anodized aluminum article. The sub-surface white mark 200 was formed using a long-working-distance scan lens (Mitutoyo 50× Plan Apo NIR HR Infinity-Corrected) that was raster scanned with pitch size of 5 µm. Some process parameters of the example process are listed as below in Table 2. FIGS. 5A and 5B (collectively FIG. 5) illustrate an anodized aluminum layer (about 30 µm in thickness) of an anodized aluminum article marked according to the white marking process described with respect to this example. FIGS. 6A through 6C illustrate respective microscopic images of the outer surface 108, the subsurface mark 200, and the bottom surface 110 of the processed anodized aluminum article 100 illustrated in FIGS. 5A and 5B. FIGS. 6A and 6C show that the outer and inner surfaces 108, 110 are intact (i.e., devoid of cracks or fractures associated with the mark 200). FIG. 6B further illustrates a microscopic image of the interior of the anodized aluminum layer 104, showing scanned lines where cracks or fractures have been formed as a result of the white marking process.

TABLE 2

| Wavelength | 1064 nm |
|---|---|
| Pulse Energy | ~1 µJ |
| Pulse Duration | 10 ps |
| Pulse Repetition Frequency | 500 kHz |
| Scan Speed | 400 mm/s |
| Bite Size | 0.8 µm to 1.0 |
| Numerical Aperture | 0.65 |
| Scan Pitch | 1-5 µm |
| Depth of Mark | ~10 µm |

Figure 9:
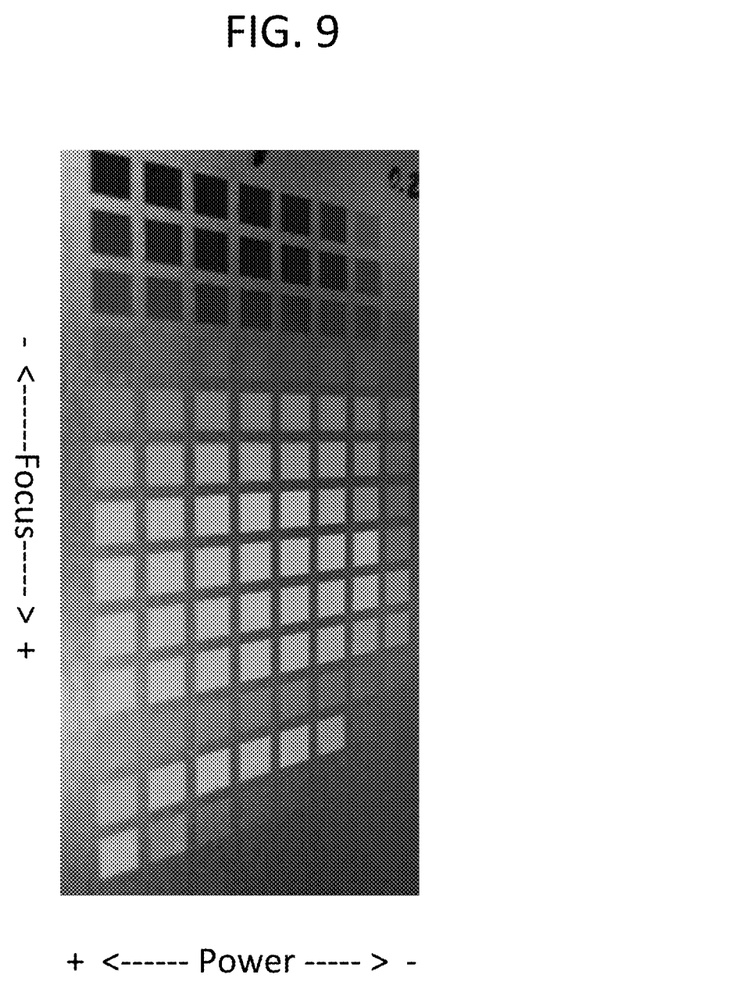
FIG. 9 depicts an array of marks run at different z-height locations within the anodization layer of an anodized aluminum article and at different power settings from the laser.

FIG. 9 depicts an array of marks 200 run at different z-height locations within the anodization layer 104 of an anodized aluminum article 100 and at different power settings from the laser 50. At negative z-height locations, the laser focal spot 80 interacts with the aluminum substrate 102, creating a black, charred appearance, even though the mark is located beneath the outer surface 108 at the interface of the anodization layer 104 and the aluminum substrate 102. This effect is previously discussed in U.S. Pat. No. 8,379,679. At positive z-height, the laser focal spot 80 impacts the outer surface 108 of the anodization layer 104, creating a surface mark. At low power, the size of the defect does not reach 100% fill factor in the mark creating low contrast marks. At high power, too much damage is sustained by the anodization layer 104 to remain intact.

Figure 10A:
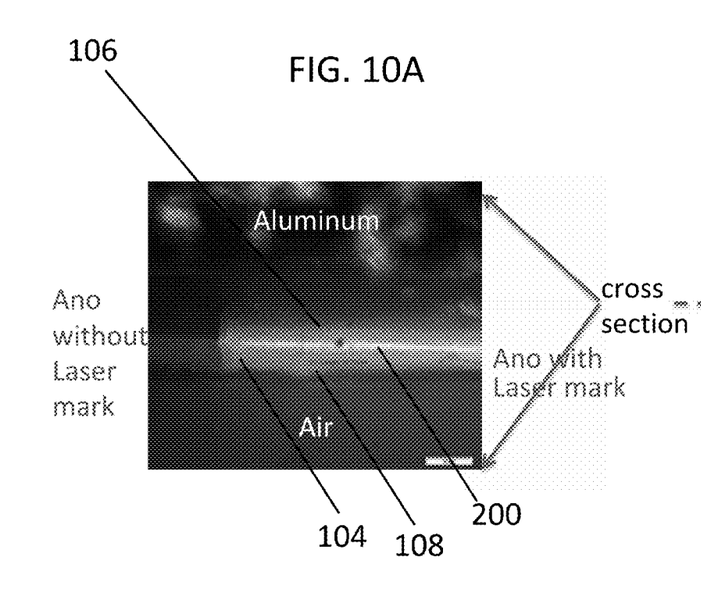
FIGS. 10A and 10B illustrate respective cross-sectional and plan views, showing an example of a mark perfectly and specifically located between the outer surface and the inner surface of the anodization layer and made with laser power chosen to provide a correct fill factor such that the anodization layer does not exhibit critical damage as shown by the surface gloss of the anodization matching that of the unmarked region.
Figure 10B:
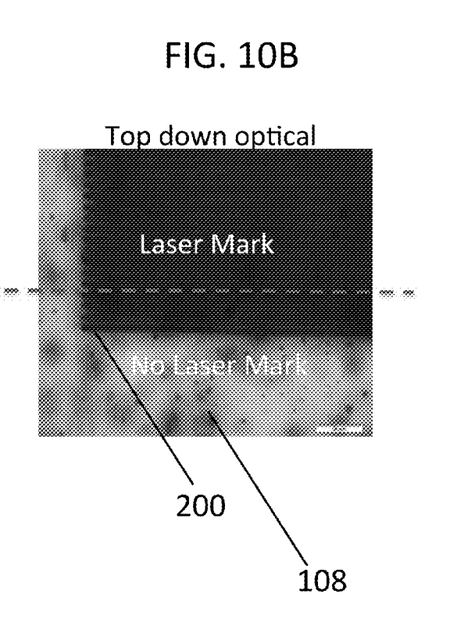

FIGS. 10A and 10B (collectively FIG. 10) illustrate respective cross-sectional and plan views, showing an example of a mark 200 perfectly and specifically located between the outer surface 108 and the inner surface 110 of the anodization layer 104 and made with laser power chosen to provide a correct fill factor such that the anodization layer 104 does not exhibit critical damage.

With reference to FIG. 10A, the cross section of the white mark 200 shows the white-appearing laser-induced defect area contained within the anodization layer 104. The impacted region of the anodization layer 104 is far enough from both of the outer surface 108 and the inner surface 110 of the anodization layer 104 such that both the outer and inner surfaces 108, 110 remain unaffected, and the volume which scatters light to create a visible mark 200 is located in the middle of the anodized layer 104.

With reference to FIG. 10B, the top-down optical microscope image shows the same laser (white) mark 200. The mark 200 appears dark in this image, however, because of the imaging techniques employed to capture the image.

Figure 11A:
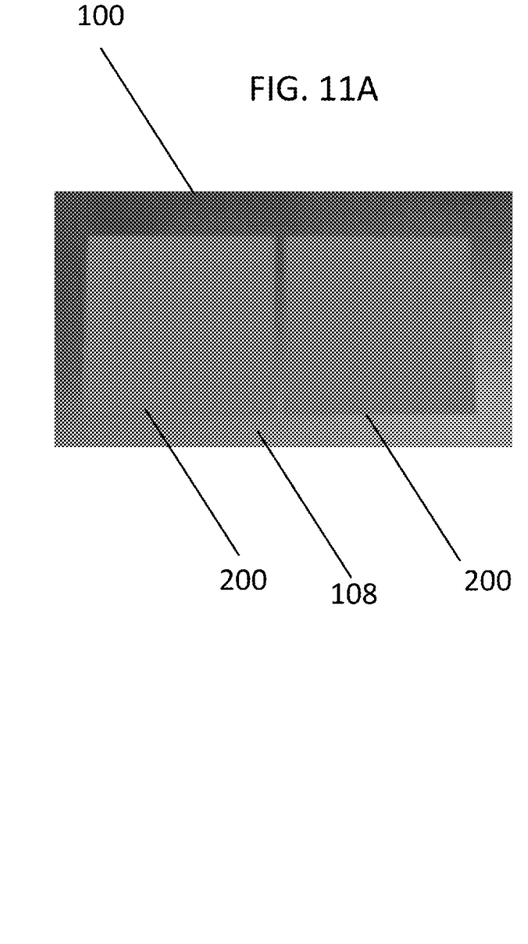
FIGS. 11A and 11B show respective camera images of a well-tuned subsurface white marks within the anodization layer of anodized aluminum.
Figure 11B:
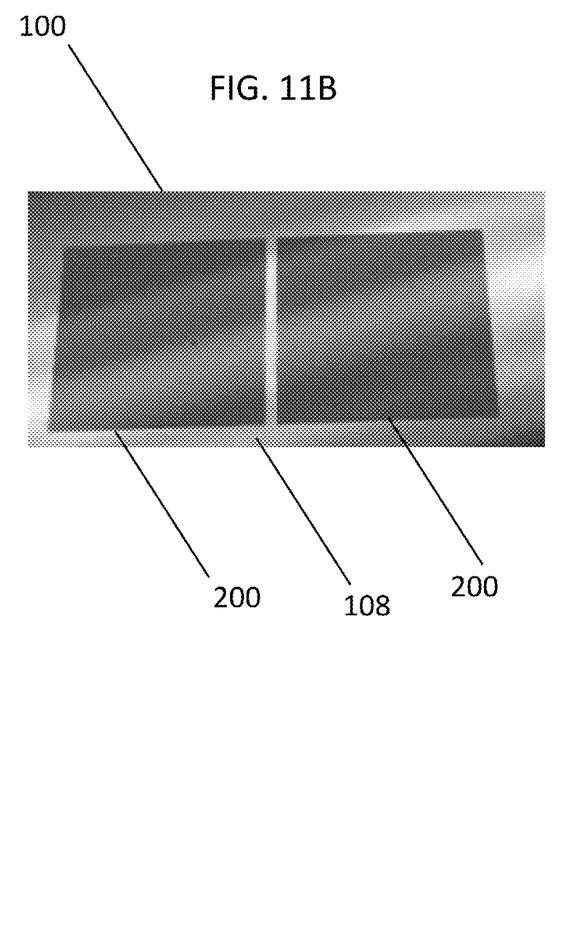

FIGS. 11A and 11B show respective camera images of a well-tuned subsurface white marks 200 within the anodization layer 104 of an anodized aluminum article 100. With reference to FIG. 11A, the marks 200 appear white with scattered incident light. With reference to FIG. 11B, the marks 200 appear dark when viewed at angle away from strong specularly reflected incident light.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A method for marking an article including a substrate and a layer supported by the substrate, wherein the layer has an inner surface and an outer surface, and wherein the outer surface has a farther distance to the substrate and the inner surface has a closer distance to the substrate, the method comprising:

generating a beam of laser output having a beam waist;
directing a focal point of the laser output between the inner surface and outer surface of the layer with an energy density at the focal point sufficient to form a plurality of structures within a region of the article, within the layer, and spaced apart from an article outer surface of the article, wherein the layer has a thickness between the inner surface and the outer surface that is less than or equal to 100 microns, and wherein the plurality of structures are configured to scatter light incident upon the outer surface of the layer.

2. The method of claim 1, wherein the thickness between the inner surface and the outer surface is less than or equal to 50 microns.

3. The method of claim 1, wherein the plurality of structures constitute a mark having an optical density with an L* value that is greater than or equal to about 60.

4. The method of claim 3, wherein the plurality of structures constitute a mark having an optical density with an L* value that is greater than or equal to about 80.

5. The method of claim 1, wherein the substrate comprises a metal, wherein the layer comprises an oxide, wherein the plurality of structures comprise a plurality of features that scatter light within the region of the article.

6. The method of claim 1, wherein the focal spot is positioned greater than 2 microns away from both the inner surface and the outer surface.

7. The method of claim 1, wherein the laser pulses impinge upon the article with a positional separation in a range from about 0.2 μm to about 2.5 μm.

8. The method of claim 1, wherein the beam of laser output is directed at the substrate at an angle of incidence that is greater than or equal to 30 degrees.

9. The method of claim 1, wherein the layer is undyed.

10. The method of claim 1, wherein the spot size is numerical aperture diffraction-limited.

11. The method of claim 1, wherein the beam waist of the laser output exhibits divergence away from the focal point that is so rapid that the energy density at the outer surface and the inner surface is sufficiently smaller than at the focal point such that the energy density at the outer surface and the inner surface is insufficient to permanently change the outer surface and the inner surface.

12. A laser system for marking an article including a substrate and a layer supported by the substrate, wherein the layer has an inner surface and an outer surface, and wherein the outer surface has a farther distance to the substrate and the inner surface has a closer distance to the substrate, the laser system comprising:
a laser configured to generate laser light;
a beam modification system configured to modify the laser light;
a lens configured to focus the laser light to a numerical aperture diffraction-limited spot size of less than or equal to 5 microns at a focal point;
a height control mechanism to adjust the height of the focal point with respect to the inner surface, the outer surface, or the substrate; and
a controller configured to control an operation of at least one of the laser, the height control mechanism, and the beam modification system such that the focal point of the laser light is directed between the inner surface and outer surface of the layer, which has a thickness between the inner surface and the outer surface that is less than or equal to 50 microns, to form a plurality of structures within a region of the article, within the layer, and spaced apart from an article outer surface of the article and such that the plurality of structures are configured to scatter light incident upon the region of the article.

13. The laser system of claim 11, wherein the thickness between the inner surface and the outer surface is less than or equal to 30 microns.

14. The laser system of claim 11, wherein the plurality of structures constitute a mark having an optical density with an L* value that is greater than or equal to about 70.

15. The laser system of claim 14, wherein the plurality of structures constitute a mark having an optical density with an L* value that is greater than or equal to about 80.

16. The laser system of claim 11, wherein the substrate comprises a metal, wherein the layer comprises an oxide, wherein the plurality of structures comprise a plurality of cracks within the region of the article.

17. The laser system of claim 11, wherein the focal spot is controlled within a height accuracy of 2 microns within the layer.

18. The laser system of claim 11, wherein the scan lens has a numerical aperture in a range from 0.3 to 0.8.

19. The laser system of claim 11, wherein the beam of laser output is directed at the substrate at an angle of incidence that is greater than or equal to 30 degrees.

20. The laser system of claim 11, wherein the layer is undyed.

21. The laser system of claim 11, wherein the spot size is numerical aperture diffraction-limited.

22. An article having a mark made with a laser, comprising:
a substrate comprising a metal;
a layer supported by the substrate and comprising an oxide, wherein the layer is undyed, wherein the layer has an inner surface and an outer surface, wherein the outer surface has a farther distance to the substrate and the inner surface has a closer distance to the substrate, and wherein the layer has a thickness between the inner surface and the outer surface that is less than or equal to 50 microns; and
a plurality of structures comprising a plurality of laser-induced features between the inner surface and outer surface of the layer and within the region of the article and within the layer, wherein the feature include one or more of laser-induced cracks, laser induced changes in index in refraction, and laser-induced voids, wherein the features terminate within the layer without extending to the outer surface or the substrate, and wherein the plurality of structures are configured to scatter light incident upon the region of the layer.

23. The article of claim 22, wherein the plurality of structures constitute a mark having an optical density with an L* value that is greater than or equal to about 70.

24. The method of claim 1, wherein the focal spot is positioned greater than 5 microns away from both the inner surface and the outer surface.

25. The method of claim 1, wherein height control feed back is employed to control the height of the focal spot within the layer.

26. The method of claim 1, wherein a major spatial axis the beam waist is greater than a factor of 110% per micron distance along the beam axis from the focal spot.

27. The method of claim 1, wherein the laser output is focused though a lens having a numerical aperture in a range from 0.3 to 0.8.

* * * * *